J. J. PAYER.
ROLLER ATTACHMENT FOR GANG PLOWS AND THE LIKE.
APPLICATION FILED OCT. 27, 1913.

1,176,240.

Patented Mar. 21, 1916.

Witnesses.
D. W. Edelin
V. T. Houghton

Inventor.
Jacob J. Payer

THE COLUMBIA PLANOGRAPH CO., WASHINGTON, D. C.

UNITED STATES PATENT OFFICE.

JACOB J. PAYER, OF ADAMS, NORTH DAKOTA.

ROLLER ATTACHMENT FOR GANG-PLOWS AND THE LIKE.

1,176,240.   Specification of Letters Patent.   Patented Mar. 21, 1916.

Application filed October 27, 1913. Serial No. 797,450.

*To all whom it may concern:*

Be it known that I, JACOB J. PAYER, a citizen of the United States, residing at Adams, in the county of Walsh and State of North Dakota, have invented certain new and useful Improvements in Roller Attachments for Gang-Plows and the like; and I do hereby declare the following to be a full, clear, and exact description of the invention, such as will enable others skilled in the art to which it appertains to make and use the same.

The present invention relates to attachments for gang-plows and the like, and more particularly to a roller attachment therefor, and has for its object to provide such a device having the general characteristics of the roller attachment disclosed in my pending application, Serial No. 694,207, filed April 30, 1912, but embodying the improvements, as hereinafter set forth.

The invention is illustrated in the accompanying drawing, in which:—

Figure 1:
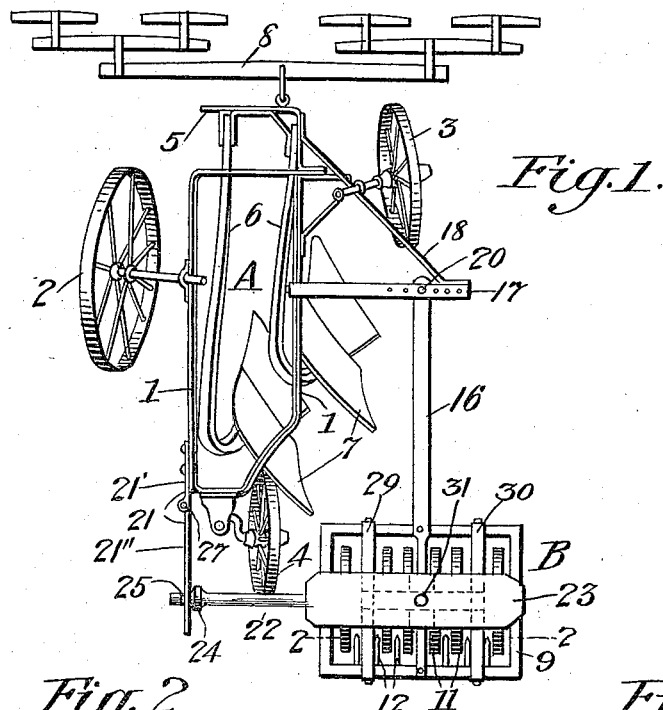
Figure 2:
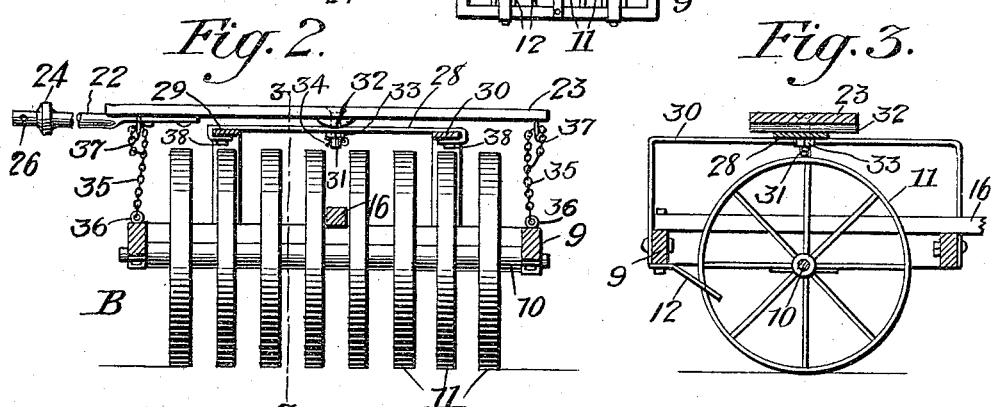
Figure 3:
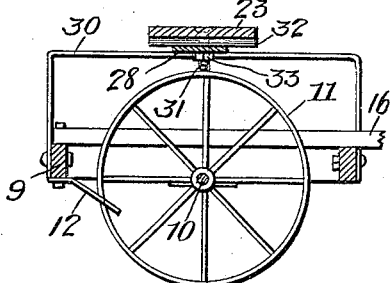
Figure 4:
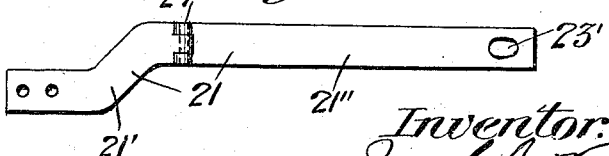

Figure 1 is a plan view showing a gang-plow of the three-wheel sulky plow type having the improved roller attachment applied thereto; Fig. 2 is a broken sectional view of the roller attachment taken on the line 2—2 of Fig. 1; Fig. 3 is a broken sectional view of the roller attachment taken on line 3—3 of Fig. 2; and Fig. 4 is an elevation of the auxiliary connection between the attachment and the plow.

Referring to the drawing, and particularly to Fig. 1, in which the roller attachment is illustrated applied to a gang-plow A of usual construction, the numeral 1 designates the frame of the plow which carries a stubble wheel 2 and front and rear furrow wheels 3 and 4. The usual adjustable clevis bar is shown at 5, to which an equalizer 8 is connected. The plow beams and plows are designated by the reference characters 6 and 7 respectively.

The roller attachment denoted generally by the reference character B in the form shown in the drawing, comprises a framework 9 having an axle 10 upon which a plurality of laterally spaced wheels 11 are rotatably and independently journaled. Interposed between the laterally spaced wheels 11 are pickers or dirt cleaners 12 secured to the rear beams of the frame 9 and projecting into the spaces between the wheels, as clearly shown in Figs. 1 and 3. The purpose of the pickers is to keep the rims of the wheels practically free from adhering dirt or mud. The frame 9 is provided with a forwardly projecting tongue 16, the front end of which is adjustably connected to a bracket comprising a lateral bar 17 and brace rod 18. The said elements 17 and 18 are rigidly connected at their outer ends, and at their inner ends are connected to the adjacent side bar of the plow frame 1. The outer end of the bar 17 is provided with a plurality of perforations through any one of which, and a perforation in the front end of the pole 16, a coupling bolt 20 may be passed, so as to vary the line of backward pull of the roller attachment on the furrow side of the plow. The lateral adjustment of the roller attachment would depend upon the lateral adjustment of the equalizer 8.

The construction of the roller attachment so far described is the same as that disclosed in my pending application referred to, and the advantages of such a construction of attachment and the manner of connecting the attachment to the plow are fully set forth in said application.

The following improvements, although particularly adapted to a roller attachment as above described, are applicable to any type of agricultural attachment applied to an implement such as a gang-plow.

It has been found in practice that the construction as described above, although thoroughly efficient in performing its function of rolling the plowed ground, when one end of the attachment is over a furrow or other depression in the ground, will tend to tilt laterally to an excessive degree, which, of course, is objectionable, due to the fact that in the present type of attachment, the operator, who rides on the attachment, cannot retain his seat. To overcome these difficulties, an auxiliary connection or brace 21 is employed secured to that side of the frame of the plow which is opposite the bracket 17. A laterally projecting pole 22 is secured to the seat 23 of the roller attachment by any suitable means, and has connection with the auxiliary brace 21 by any means, such as passing the extremity of the pole 22 through an opening 23', in the extremity of the brace 21 until a shoulder 24 on the pole 22 abuts against said brace 21. Preferably, the outer face of the shoulder 24 is slightly curved, as shown in the drawing, to permit an angular change in all planes between the brace 21 and the pole 22.

The opening 23' is slightly elongated in a horizontal direction, as shown in the drawing, to permit sufficient angular change between the brace 21 and pole 22 when turning corners. The connection between the brace 21 and pole 22 may be maintained by passing a key 25 through a suitable perforation 26 in the pole 22.

The brace 21 is provided with a hinge 27 which permits the two portions 21' and 21" of the brace 21 to change their angular relation, but prevents any vertical movements of the member 21".

The driver's seat 23 has a limited transverse tilting movement with respect to the roller attachment, or conversely, the roller attachment has a transverse tilting movement independent of the seat. The roller attachment is also permitted to swivel or to turn to a slight extent independent of the seat 23. These results are accomplished preferably by mounting the seat 23 on a transverse saddle element 28 having U-shaped extremities which engage the supports 29 and 30 mounted on the frame 9 of the roller attachment. The seat 23 is pivoted to said saddle element 28 by means of a pin 31 secured to the seat and passing through an opening in the element 28, a suitable rocking element 32 being secured to the seat and interposed between the seat 23 and the saddle element 28. The seat may be retained on the saddle element 28 by holding a nut or washer 33 on the pin 31 by any suitable means, such as a cotter pin 34. In order to limit the pivotal and tilting movements of the roller attachment relative to the seat, the chains 35 are preferably provided secured to the end members of the framework 9, such as by means of the eye-bolts 36, said chains being looped through similar eye-bolts 37 carried by the seat. In this way, the chains may be loosened or tightened by taking up or letting out one or more links in the chains, and thereby making the looped portion of the chains larger or smaller, as the case may be. A simple adjustment is therefore provided to regulate the amount of relative movement permitted between the roller attachment and the seat.

The saddle element 28 is preferably mounted upon the supports 29 and 30, for sliding movements thereon, so that the seat 23 may be adjusted forwardly or rearwardly to vary the effect of the rider's weight on the roller attachment. Set screws 38 are preferably provided in the looped or U-shaped extremities of the saddle element 28, in order to secure the latter in the desired adjusted position.

From the foregoing, it will be seen that the operator may ride comfortably upon the seat 23 which is independent of small transverse tilting movements of the roller attachment and small turning movements thereof. The pivotal connection 20 and the hinged connection 27, in coöperation with the connection between the brace 21 and pole 22, permit the roller attachment to follow behind the plow and have swinging or turning movements with respect thereto in a horizontal plane, but it is held against extreme tilting movements by the brace 21, pole 22, seat 23 and chains 35. The connection between the seat 23 and the saddle element 28, however, permits the rollers to follow the normal contour of the ground without affecting the position of the seat 23. Any extreme unevenness of the ground which is sufficient to make one of the chains 35 taut will tend to tilt the seat laterally about its transverse axis, but such movements of the seat are prevented by the brace 21 and pole 22. The result is that one side of the attachment will be held off of the lower portion of the ground by means of the taut chain. Obviously, if the ground were so uneven as to cause one end of the roller attachment to be supported by a relatively high portion of the ground, and the other end to be over a low portion thereof, the chain at that side of the attachment which is over such low portion of the ground will support its end of the attachment and hold the same out of the depression in the ground. The pivotal connection between the seat 23 and the saddle element 28 constitutes in reality a pivotal connection between the pole 22 and the tongue 16, and thereby permits the attachment to follow and turn with the plow as a result of the other pivotal connections.

What I claim is:—

1. The combination with a gang plow or the like, of an agricultural attachment comprising a frame pivotally connected to the plow, a seat on said frame, means connecting said seat with the plow to prevent lateral tilting movements of the seat about its transverse axis, the frame of the attachment being capable of limited transverse tilting movements about its horizontal axis independent of the seat, and means to prevent extensive tilting movements of the attachment relative to the seat.

2. The combination with a gang plow or the like, of an agricultural attachment comprising a frame pivotally connected to the plow, a seat on said frame, means connecting said seat with the plow to prevent lateral tilting movements of the seat about its transverse axis, the frame of the attachment being capable of limited transverse tilting movements about its horizontal axis independent of the seat, and connections between the seat and the frame to limit the tilting movements of the seat relative to the frame.

3. The combination with a gang plow or the like, of an agricultural attachment therefor comprising a frame pivotally connected to the plow, a seat on said frame, said frame being capable of transverse tilting movements about its horizontal axis independent of the seat, connections between the plow and the seat to hold the latter rigid against lateral tilting movements about its transverse axis, and connections between the extremities of the seat and the frame of the attachment to limit the tilting movements of the frame relative to the seat.

4. The combination with a gang plow or the like, of an agricultural attachment, a draft connection between the attachment and one side of the plow, and bracing connections between the attachment and the other side of the plow, said connections comprising a laterally extending member on the attachment, a rearwardly extending member on the plow connected to said first-named member, and a hinge interposed in the length of said rearwardly extending member on the plow, for the purpose described.

5. The combination with an agricultural attachment for gang plows and the like, of a seat supported thereon along the transverse axis of the seat so as to permit transverse tilting movements between the seat and the attachment, said seat being pivoted to the attachment at a point on said transverse axis so as to permit relative swiveling movements between the seat and the attachment.

6. The combination with a roller attachment for gang-plows, of a seat thereon, said seat having limited transverse tilting and swiveling movements relative to the attachment and being adjustable forwardly and rearwardly to vary the effect of the rider's weight on the attachment.

7. The combination with a gang-plow or the like, of an agricultural attachment, a seat for said attachment so mounted thereon as to permit the attachment to have limited tilting and turning movements relative to the seat, means for pivotally connecting the attachment to one side of the plow, and connections between the other side of the plow and said seat to prevent lateral tilting movements of the seat about its transverse axis.

8. The combination with a gang-plow or the like, of an agricultural attachment, a seat for said attachment so mounted thereon as to permit the attachment to have limited tilting and turning movements relative to the seat, a forwardly projecting tongue on said attachment, a laterally projecting bracket on one side of the plow to which said tongue is pivotally connected, and pivotal connections between said seat and the opposite side of the plow, said connections adapted to hold said seat rigid against lateral tilting movements about its transverse axis.

9. The combination with a gang plow or the like, of an agricultural attachment, a seat for said attachment so mounted thereon as to permit the attachment to have limited tilting movements relative to the seat, means for pivotally connecting the attachment to one side of the plow, and connections between the other side of the plow and said seat to prevent lateral tilting movements of the seat about its transverse axis.

In testimony whereof I affix my signature in presence of two witnesses.

JACOB J. PAYER.

Witnesses:
 ARTHUR L. BRYANT,
 VERNON T. HOUGHTON.

Copies of this patent may be obtained for five cents each, by addressing the "Commissioner of Patents, Washington, D. C."